(12) United States Patent
Schaefer et al.

(10) Patent No.: US 7,704,620 B2
(45) Date of Patent: Apr. 27, 2010

(54) LAMINAR BYPASS FOR CASCADED STACK

(75) Inventors: Robert Schaefer, Darmstadt (DE);
Sebastian Lienkamp, Bundenheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1302 days.

(21) Appl. No.: 11/196,539

(22) Filed: Aug. 3, 2005

(65) Prior Publication Data

US 2007/0031720 A1 Feb. 8, 2007

(51) Int. Cl.
*H01M 8/04* (2006.01)
*H01M 2/14* (2006.01)

(52) U.S. Cl. .............................. 429/26; 429/34; 429/38; 429/39

(58) Field of Classification Search .................. 429/13, 429/16–18, 22–26, 32, 34, 38–39
See application file for complete search history.

(56) References Cited

U.S. PATENT DOCUMENTS

| 3,277,959 | A | * | 10/1966 | Withers ........................ 165/159 |
| 5,413,878 | A | * | 5/1995 | Williams et al. ............... 429/16 |
| 5,478,662 | A | | 12/1995 | Strasser ......................... 429/13 |
| 6,344,289 | B2 | * | 2/2002 | Dekker et al. .................. 429/17 |
| 6,821,668 | B1 | * | 11/2004 | Perry et al. ..................... 429/38 |
| 2003/0190502 | A1 | * | 10/2003 | Illner et al. ..................... 429/13 |
| 2006/0240302 | A1 | * | 10/2006 | Senner et al. .................. 429/32 |
| 2008/0145718 | A1 | * | 6/2008 | Bette et al. ..................... 429/13 |

FOREIGN PATENT DOCUMENTS

| EP | 1213780 A2 | 6/2002 |
| EP | 1294037 A2 | 3/2003 |
| JP | 05151985 A | * | 6/1993 |

OTHER PUBLICATIONS

Machine Translation and Abstract in English of JP 05-151985.*
U.S. Appl. No. 11/113,574, filed Apr. 25, 2005, Senner, et al.

* cited by examiner

*Primary Examiner*—Dah-Wei D Yuan
*Assistant Examiner*—Claire L Rademaker
(74) *Attorney, Agent, or Firm*—John A. Miller; Miller IP Group, PLC

(57) ABSTRACT

A fuel cell stack that includes cascaded stack stages and tube bundle flow restrictions for providing a cathode input gas to each stage in the stack. The stack includes a first flow pipe for providing cathode gas flow to a first stage of the plurality of stages of the fuel cell stack. The fuel cell stack also includes a second flow pipe that receives a cathode exhaust gas flow from the first stage and fresh cathode gas flow, where the cathode exhaust gas flow and the fresh cathode gas flow are combined and sent to a second stage of the plurality of stages of the fuel cell stack. The tube bundle flow restriction is positioned within the second flow pipe and controls the flow of the cathode gas flow to the second stage, where the flow restriction provides a laminar flow through the control valve to the second stage.

25 Claims, 2 Drawing Sheets

US 7,704,620 B2

LAMINAR BYPASS FOR CASCADED STACK

BACKGROUND OF THE INVENTION

1. Field of the Invention

This invention relates generally to a cascaded fuel cell stack including anode and cathode gas flow and, more particularly, to a cascaded fuel cell stack including anode and cathode gas flow, where bundles of flow tubes are used to control the cathode gas flow provided to each stage in the cascaded stack, and where the flow tubes provide a laminar gas flow and linear pressure changes.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the MEA. Cathode gas flow channels are provided on the cathode side of the bipolar plates that allow the cathode gas to flow to the MEA. The bipolar plates are made of a conductive material, such as stainless steel, so that they conduct the electricity generated by the fuel cells out of the stack. The bipolar plates also include flow channels through which a cooling fluid flows.

It is necessary that a fuel cell operate at an optimum relative humidity and temperature to provide efficient stack operation and durability. The temperature provides the relative humidity within the fuel cells in the stack for a particular stack pressure. Excessive stack temperature above the optimum temperature may damage fuel cell components, reducing the lifetime of the fuel cells. Also, stack temperatures below the optimum temperature reduces the stack performance. In some fuel cell stack designs, it is necessary to humidify the cathode input gas before it is sent to the fuel cell stack, which increases system complexity and cost.

It is known in the art to direct the anode gas flow and the cathode gas flow through the fuel cell stack in opposite directions (counter flow) to provide an increased humidification of the membranes within the stack. As the anode and the cathode gases flow through the stack, they pick up moisture as a result of the water by-product of the electro-chemical reaction. Particularly, the fuel cells toward the anode gas exhaust end of the fuel cell stack will be humidified mostly by moisture in the anode gas flow and the fuel cells toward the cathode gas exhaust end of the fuel cell stack will be humidified mostly by the anode gas flow.

Further, it is known in the art to cascade the fuel cell stack by separating the fuel cells into multiple stages. In this design, the anode and cathode input flow to one stage comes from the anode and cathode exhaust flow, respectively, from the previous stage. The anode or cathode exhaust flow from one stage is output from the stage at an opposite end of the stage from the input of the anode or cathode flow to the stage.

By separating the fuel cell stack into cascaded stages, the stoichiometry of the stack decreases, where less cathode and anode gas flow is required to achieve the desired stack load. In other words, less anode and cathode gas flow is necessary so that enough of the MEAs in the fuel cells receive enough of the input gas to generate the desired power. The efficiency of the fuel cell system decreases as the stoichiometry of the stack increases because a significant amount of additional hydrogen fuel and cathode air flow may be required to meet the fuel cell stack load. Because hydrogen is combustible and expensive to manufacture, it is desirable to minimize the amount of hydrogen at the anode exhaust of the stack so that collection or treatment of the hydrogen is reduced to minimize system complexity and cost.

Known cascaded fuel cell stack designs typically employ an anode exhaust valve that is generally closed so that the last stage in the stack; operates dead-ended. The anode exhaust valve is periodically opened to purge accumulated gas and water from the last stage of the stack.

U.S. patent application Ser. No. 11/113,574, titled Fuel Cell Operating Method with Improved Hydrogen and Oxygen Utilization, filed Apr. 25, 2005, assigned to the Assignee of this application and herein incorporated by reference, addresses this concern. In that fuel stack design, cathode air flow from the compressor is combined with the cathode exhaust gas from each stage as an input to the following stage. This allows a desired amount of fresh air to be sent to each stage, and still maintain the desired humidity level for the MEAs.

FIG. 1 is a perspective view of a cascaded fuel cell stack 10 of the type disclosed in the '574 application. The fuel stack 10 includes a first fuel cell stack stage 12, a second fuel cell stack stage 14 and a third fuel cell stack stage 16, where the first stage 12 has the most fuel cells and the third stage 16 has the fewest fuel cells. An anode inlet pipe 20 coupled to one end of the first stage 12 receives the hydrogen anode input gas. The hydrogen input gas flows through the anode flow channels in the first stage 12 and is output from the first stage 12 through a flow pipe 22 at an opposite end of the first stage 12. The anode gas flow from the flow pipe 22 enters the second stage 14, and flows through the anode flow channels therein. The anode gas flow is output from the second stage 14 through a flow pipe 24 at an opposite end of the second stage 14. The anode gas flow from the flow pipe 24 enters the third stage 16 and flows through the anode flow channels therein, where it is output from the third stage 16 through a flow pipe 26 at an opposite end of the third stage 16.

Cathode input air enters the third stage 16 through a flow pipe 30. The cathode air flows through the cathode flow channels in the third stage 16, and is output from the third stage 16 through a flow pipe 32 at an opposite end of the third stage 16. Additionally, feed air is provided through a flow pipe 36 into the flow pipe 32 to be combined with the air that has flowed through the third stage 16. The combined cathode air from the flow pipe 32 enters the second stage 14 and flows through the cathode flow channels therein. The cathode air exits the second stage 14 through a flow pipe 40 at an opposite end of the first second 14. Additionally, feed air is provided through a flow pipe 42 that directs the feed air into the flow pipe 40 to be combined with the air that has flowed through the second stage 14. The combined cathode air from the pipe 40 enters the first stage 12 and flows through the cathode flow channels therein to exit the fuel cell stack 12 through a flow pipe 44 as the cathode exhaust at an opposite end of the first stage 12.

The '574 application proposes employing proportional control valves for the cathode air being input to the third stage 16 through the pipe 30, the second stage 14 through the pipe 36, and the first stage 12 through the pipe 42. However, it has been observed that using the proportional valves for this purpose does not provide a linear turn-down ratio. Particularly, using the proportional valves does not provide a linear relationship between the overall cathode input airflow as a result of stack demand and the flow rate of the different cathode input airflows. Because the flow channels within the stages 12, 14 and 16 provide a laminar flow, an increase in the flow rate will have a corresponding increase in the pressure of the flow channels that is linear. However, for a proportional control valve, the orifice used in the valve provides a turbulent flow where the pressure across the valve increases by a power of two with an increased flow rate.

It is necessary that the flow rate through each of the stages 12, 14 and 16 remains constant with the flow rate from the air applied to the input pipes 30, 36 and 42 so that the cathode stoichiometrics for the individual stages remain constant. Therefore, the proportional valves have to be controlled accordingly to provide the desired flow through the stages 12, 14 and 16. Thus, each time the demand on the stack 12 changes, the proper valve position for the proper flow through the proportional valves needs to be recalculated so that the pressure drop remains constant. This requires feedback control, which adds to the cost and complexity of the system. Further, by providing an acceptable turn down ratio, for example 1-100, it is necessary that the proportional valves are also able to operate over this wide of turn-down range.

SUMMARY OF THE INVENTION

In accordance with the teachings of the present invention, a fuel cell stack for a fuel cell system is disclosed that includes cascaded stack stages and tube bundle type flow restrictions for providing a cathode input gas to each stage in the stack. The fuel cell stack includes a first flow pipe for providing cathode air flow to a first stage of the plurality of stages of the fuel cell stack. The fuel cell stack also includes a second flow pipe that receives a cathode exhaust gas flow from the first stage and fresh cathode air flow, where the cathode exhaust gas flow and the fresh cathode gas flow are combined and sent to a second stage of the plurality of stages of the fuel cell stack. The tube bundle flow restriction is positioned within the second flow pipe and controls the flow of the cathode gas flow to the second stage, where the flow restriction provides a laminar flow through the flow restriction to the second stage. The flow restriction may be a bundle of cylindrical tubes, rectangular tubes or any other suitable shape.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell stack including cascaded fuel cell stack stages and flow restrictions is merely exemplary in nature, and is in no way intended the limit the invention or its applications or uses.

Figure 1:
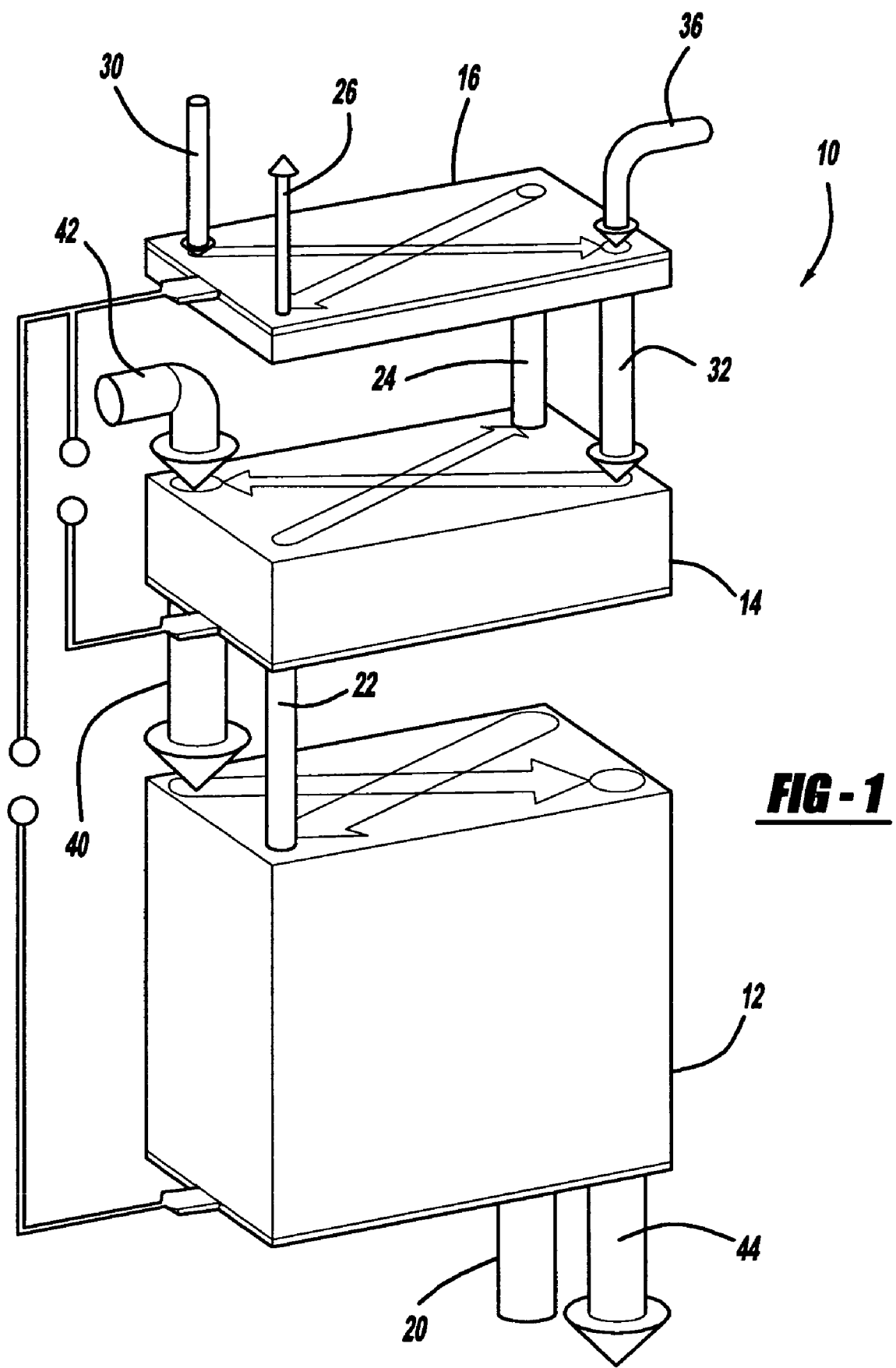
FIG. 1 is a perspective view of a fuel cell stack employing cascaded fuel cell stack stages, where a cathode input gas is separately applied to each stage.
Figure 2:
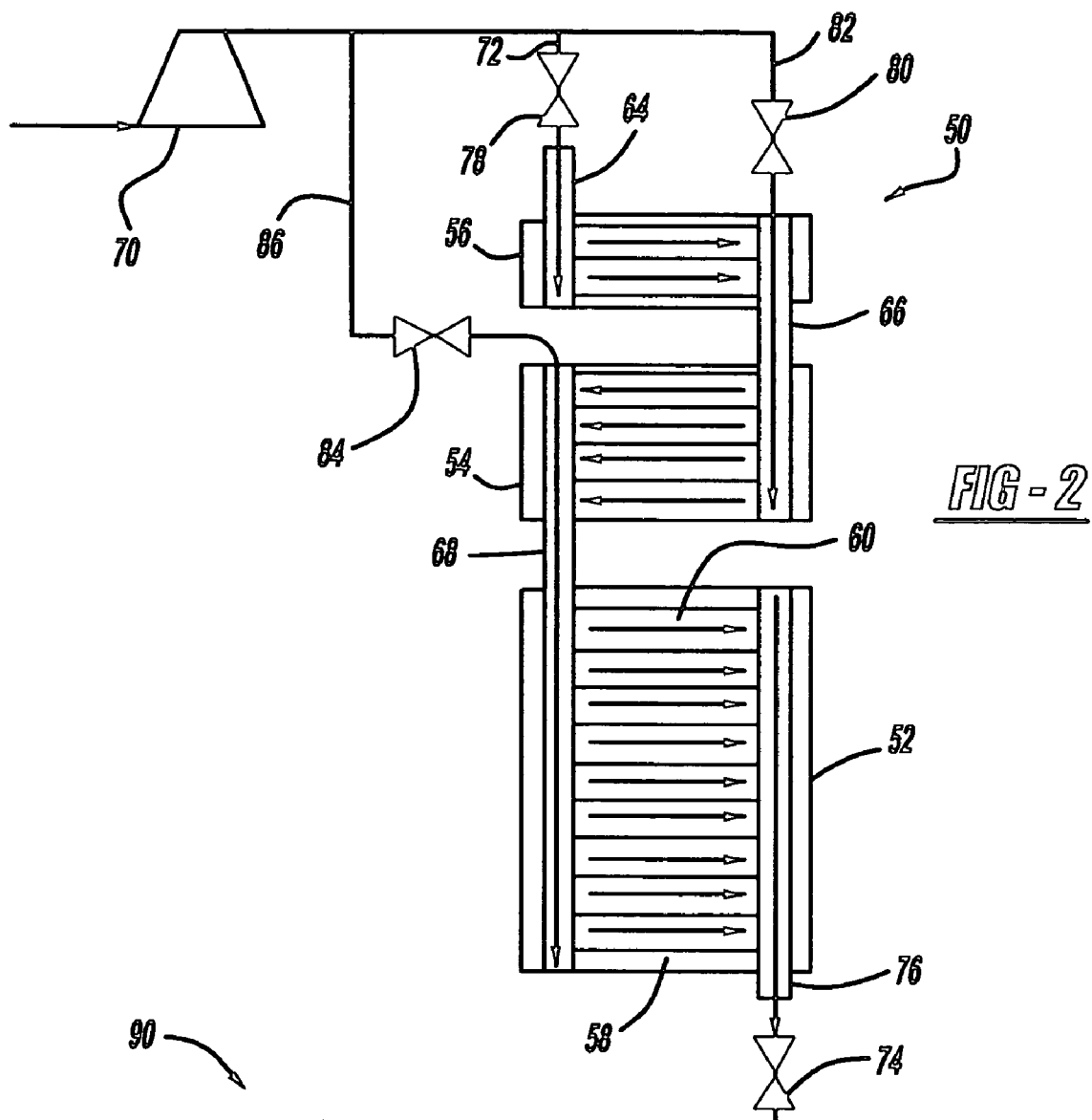
FIG. 2 is a cross-sectional view of a fuel cell stack including cascaded fuel cell stack stages providing cathode flow channels through each of the stages in the stack and flow restrictions for a cathode input for each stage, according to an embodiment of the present invention.

FIG. 2 is a cross-sectional view of a fuel cell stack 50 including a plurality of fuel cell stack stages, particularly a first stage 52, a second stage 54 and a third stage 56, where the first stage 52 has the most fuel cells and the third stage 56 has the fewest fuel cells. Each fuel cell 58 in the stages 52-56 includes cathode flow channels 60, where the arrows show the direction of the cathode air flow through the flow channels 60. In this non-limiting embodiment, the anode gas flow and the cathode gas flow would be a counter-flow. The fuel cell stack 50 is similar to the fuel cell stack 10 discussed above where the cathode input gas is applied to the third stage 56 through a flow pipe 64, and cathode exhaust gas exits the stack 50 from the third stage 56. Further, fresh cathode air is provided to the second stage 54 through a flow pipe 66, and cathode exhaust gas from the second stage 54 and fresh cathode air is provided to the first stage 52 through a flow pipe 68.

Although the fuel cell stacks 10 and 50 discussed herein have a particular stage design providing counter anode and cathode gas flow, it is stressed that this design is just one example of stack designs that could benefit from the invention as discussed below. Particularly, the discussion below of the flow restrictions of the invention is also applicable for other stage designs, including more or less stages, different numbers of cells in each stage, etc. Further, the flow restriction of the invention is independent of the anode flow field design or flow direction.

A compressor 70 provides the cathode input gas to the flow pipes 64, 66 and 68. An exhaust valve 74 in a cathode output pipe 76 from the first stage 52 controls the pressure of the cathode flow gas within the fuel cell stack 50. A flow restriction 78 is provided in a line 72 between the compressor 70 and the pipe 64. Likewise, a flow restriction 80 is provided in a line 82 between the compressor 70 and the pipe 66. Likewise, a flow restriction 84 is provided in a line 86 between the compressor 70 and the pipe 68.

Figure 3:
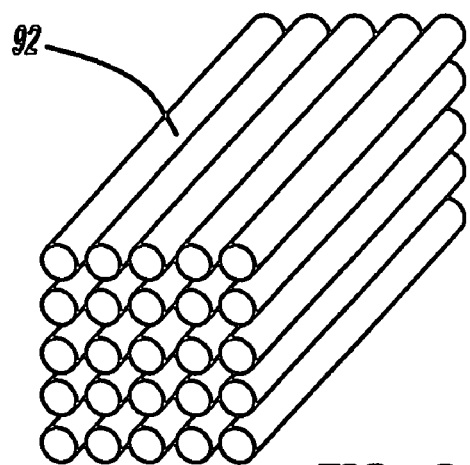
FIG. 3 is a perspective view of a bundle of cylindrical tubes that can be used for the flow restrictions shown in FIG. 2, according to one embodiment of the present invention.

According to the invention, the proportional valves used in the cascaded fuel cell stack of the '514 application are replaced with tube bundles to provide a laminar flow characteristic. FIG. 3 is a perspective view of a tube bundle 90 including a bundle of tubes 92 that can be used for the flow restrictions 78, 80 and 84. The tube bundle 90 provides a laminar flow of the cathode air so that the pressure drop across the tube bundle 92 is linear with the flow rate. The tubes 92 provide the control of the flow through the tube bundle 90, and the combination of the tubes 92 within the bundle 90 provides the laminar flow characteristic that also provide the linear pressure drop throughout the stages 52, 54 and 56 as the demand on the fuel cell stack 50 changes.

The number of tubes 92 in the bundle 90, the length of the tubes 92 and the diameter of the tubes 92 are all selected to provide a laminar flow characteristic of the air flow through the tube bundle 90 for the range of flow rates that can be expected in the fuel cell system. For laminar flow restrictions, the differential pressure across the restriction is proportional to the volume flow rate as:

$$\Delta p = \dot{V} \cdot k \quad (1)$$

Equation (1) is valid for any kind of cross-section of the flow path as long a certain maximum flow rate is not exceeded. Particularly, for a circular tube, equation (1) can be written as:

$$\Delta p = \dot{V} \cdot \frac{128 \cdot h \cdot \eta}{\pi \cdot d^4} \quad (2)$$

When designing a laminar flow resistance, the diameter d and the length h of the tube need to produce the desired differential pressure at a given flow rate. Additionally, the diameter d is limited by the average fluid velocity at a maximum flow rate. Only diameters that result in a Reynolds number Re smaller than 2300 ensure a laminar flow characteristic. The Reynolds number Re is derived from:

$$Re = \frac{\bar{v} \cdot d \cdot \rho}{\pi} \leq 2300 \quad (3)$$

In equations (1)-(3) above, $\dot{V}$ is the volume flow, Dp is the differential pressure, k is the proportional factor, h is the tube length, d is the inner tube diameter, $\eta$ is the fluid viscosity, $\rho$ is the fluid density and $\bar{v}$ is the average fluid velocity.

The number of tubes 90, the diameter of the tubes 90 and the length of the tubes 90 could be determined by the above equations by anyone having ordinary skill in the art to get the desired laminar flow characteristic. In one non-limiting example for a stack gross power of 110 kW, 160 kPa pressure through the first stage and 1.3 overall stoichiometry, there could be about 500 of the tubes 90, the diameter of the tubes 90 could be about 0.356 mm and the length of the tubes 90 could be about 300 mm.

The embodiment of FIG. 2 shows the flow restrictions 78, 80 and 84 outside of the stack stages 54 and 56. However, in another embodiment, the tube bundle 90 can be positioned within the pipes 64, 66 and 68 within the fuel cell stack 50 to reduce the system complexity. In this design, the cross-sectional configuration of the tubes 92 can be the same as the cross-sectional shape of the flow channels 60 to provide the laminar flow through the tube bundle 90 into the flow channels 60.

Figure 4:
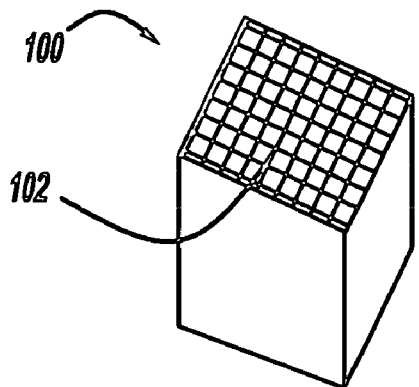
FIG. 4 is a perspective view of a bundle of square tubes that can be used for the flow restrictions shown in FIG. 2, according to another embodiment of the present invention.

Additionally, other various shapes and configurations of the tubes 92 can be provided within the scope of the present invention. FIG. 4 is a perspective view of a tube bundle 100 including rectangular shaped tubes 102 that can replace the tube bundle 90, according to the invention. Other shapes may also be applicable.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack separated into a plurality of stack stages, each stack stage including a plurality of fuel cells, each fuel cell including cathode flow channels;
   a first flow pipe for providing a fresh cathode gas flow to a first stage of the plurality of stages of the fuel cell stack;
   a second flow pipe receiving a cathode exhaust gas flow from the first stage and fresh cathode gas flow, wherein the cathode exhaust gas flow and the fresh cathode gas flow are combined and sent to a second stage of the plurality of stages of the fuel cell stack; and
   a first flow restriction positioned within the second flow pipe, said first flow restriction controlling the flow of the cathode gas flow to the second stage, said first flow restriction including a plurality of elongated flow members for providing a laminar flow characteristic through the first flow restriction to the second stage.

2. The fuel cell system according to claim 1 wherein the elongated flow members are a bundle of cylindrical tubes.

3. The fuel cell system according to claim 1 wherein the elongated flow members are a bundle of rectangular tubes.

4. The fuel cell system according to claim 1 wherein the elongated flow members have a cross-sectional shape that is the same as the cross-sectional shape of the cathode flow channels.

5. The fuel cell system according to claim 1 wherein the first flow restriction is external to the first stage and the second stage.

6. The fuel cell system according to claim 1 wherein the first flow restriction is internal to the first stage of the fuel cell stack.

7. The fuel cell system according to claim 1 wherein the first flow restriction is internal to the second stage of the fuel cell stack.

8. The fuel cell system according to claim 1 further comprising a second flow restriction and a third stage, said second flow restriction receiving a cathode gas flow from the second stage and fresh cathode gas, said second flow restriction providing a cathode input gas to the third stage of the fuel cell stack, said second flow restriction also including a plurality of elongated flow members for providing a laminar flow characteristic.

9. The fuel cell system according to claim 8 wherein the first stage has the most fuel cells and the third stage has the fewest fuel cells.

10. The fuel cell system according to claim 1 wherein there are about 500 elongated members, the diameter of the elongated members is about 0.356 mm and the length of the elongated members is about 300 mm.

11. The fuel cell system according to claim 1 further comprising a compressor, said compressor providing the fresh cathode gas flow.

12. The fuel cell system according to claim 1 wherein the fuel cell system is on a vehicle.

13. A fuel cell system comprising:
a fuel cell stack separated into a first, second and third stack stages, each stack stage including a plurality of fuel cells, each fuel cell including cathode flow channels;
a compressor for providing a fresh cathode air flow;
a first flow pipe receiving the cathode air flow from the compressor and providing the fresh cathode air flow to the first stack stage;
a second flow pipe receiving a cathode exhaust gas flow from the first stage and the fresh cathode air flow from the compressor, wherein the cathode exhaust gas flow and the fresh cathode air flow are combined and sent to the second stack stage;
a first flow restriction positioned within the second flow pipe, said first flow restriction controlling the flow of the cathode gas flow to the second stack stage, said first flow restriction including a plurality of elongated flow members for providing a laminar flow characteristic through the first flow restriction to the second stack stage;
a third flow pipe receiving a cathode exhaust gas flow from the second stage and the fresh cathode air flow from the compressor, wherein the cathode exhaust gas flow and the fresh cathode air flow are combined and sent to the third stack stage; and
a second flow restriction positioned within the third flow pipe, said second flow restriction controlling the flow of the cathode gas flow to the third stack stage, said second flow restriction including a plurality of elongated flow members for providing a laminar flow characteristic through the second flow restriction to the third stack stage, wherein the first stage has the most fuel cells and the third stage has the fewest fuel cells.

14. The fuel cell system according to claim 13 wherein the elongated flow members are a bundle of cylindrical tubes.

15. The fuel cell system according to claim 13 wherein the elongated flow members are a bundle of rectangular tubes.

16. The fuel cell system according to claim 13 wherein the elongated flow members have a cross-sectional shape that is the same as the cross-sectional shape of the cathode flow channels.

17. The fuel cell system according to claim 13 wherein the first flow restriction is external to the first stack stage and the second flow restriction is external to the second stack stage.

18. The fuel cell system according to claim 13 wherein the first flow restriction is internal to the first stack stage and the second flow restriction is internal to the second stack stage.

19. The fuel cell system according to claim 13 wherein there are about 500 elongated members, the diameter of the elongated members is about 0.356 mm and the length of the elongated members is about 300 mm.

20. The fuel cell system according to claim 13 wherein the fuel cell system is on a vehicle.

21. A fuel cell system comprising:
a fuel cell stack including a stack of fuel cells each including a plurality of parallel flow channels; and
a flow restriction for controlling a flow of cathode gas to the flow channels in the fuel cells, said flow restriction including a plurality of elongated flow members for providing a laminar flow characteristic through the flow restriction.

22. The fuel cell system according to claim 21 wherein the elongated flow members are a bundle of cylindrical tubes.

23. The fuel cell system according to claim 21 wherein the elongated flow members are a bundle of rectangular tubes.

24. The fuel cell system according to claim 21 wherein the elongated flow members have a cross-sectional shape the same as the cross-sectional shape of the flow channels.

25. The fuel cell system according to claim 21 wherein there are about 500 elongated members, the diameter of the elongated members is about 0.356 mm and the length of the elongated members is about 300 mm.

* * * * *